INVENTOR.
Roger W. Levan

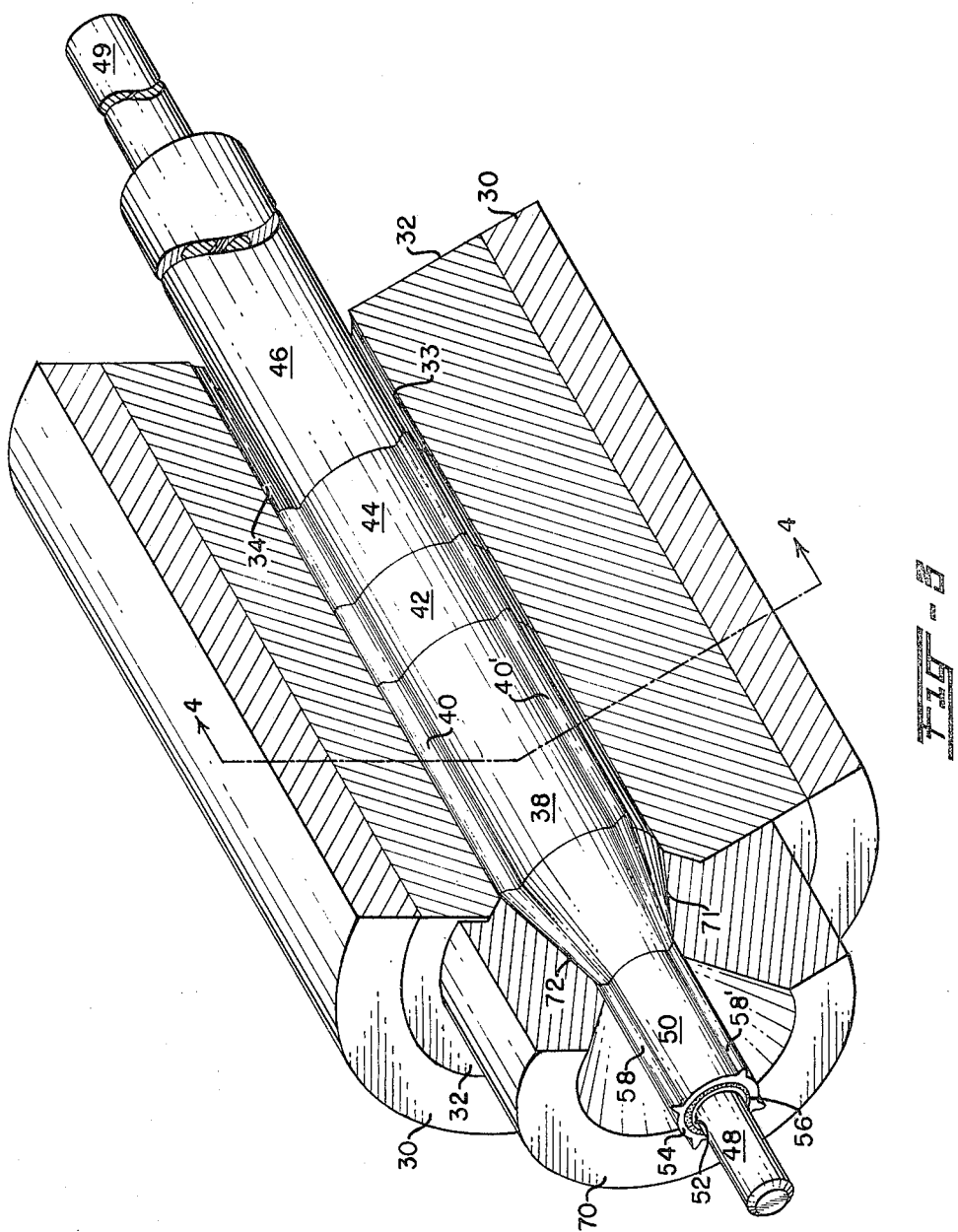

Dec. 2, 1969    R. W. LEVAN    3,482,003
METHOD OF EXTRUSION OF RIBBED COMPOSITE MEMBERS
Filed Dec. 6, 1967    3 Sheets-Sheet 3

INVENTOR.
Roger W. Levan
BY

United States Patent Office 3,482,003
Patented Dec. 2, 1969

3,482,003
METHOD OF EXTRUSION OF RIBBED COMPOSITE MEMBERS
Roger W. Levan, North Augusta, S.C., assignor to the United States of America as represented by the United States Atomic Energy Commission
Filed Dec. 6, 1967, Ser. No. 690,700
Int. Cl. G21c 21/00
U.S. Cl. 264—.5          8 Claims

ABSTRACT OF THE DISCLOSURE

Ribbed composite members, solid or tubular, are extruded from ribbed composite billets. An extrusion container or liner has longitudinal channels adapted to receive the longitudinal ribs of the clad surface of the ribbed billet. By applying pressure to the ribbed billet with an extrusion ram, ribbed composite members are extruded through a rib-forming die. Ribbed composite tubular members are extruded, using a suitable mandrel, from hollow ribbed billets. The mandrel can also be provided with rib channels to extrude tubular members having interior ribs. Circumferential cladding flow and core upset are controlled by providing sufficient material in the billet rib. The method is particularly applicable to the extrusion of ribbed nuclear reactor fuel elements.

BACKGROUND OF THE INVENTION

The invention described herein was made in the course of, or under a contract with, the U.S. Atomic Energy Commission.

Field of the invention

This invention relates generally to the extrusion of composite billets in an extrusion press and more particularly to a method of extrusion of ribbed composite members from composite ribbed billets in an extrusion press.

Description of the prior art

Extrusion metal working techniques are particularly suitable for the fabrication of elongated seamless solid or tubular members, such as nuclear reactor fuel elements in the form of either rods or tubes. Nuclear fuel elements are generally formed by coextrusion of a "composite" cylindrical billet that has a core of nuclear fuel material encased in a compatible cladding material. Core materials that are commonly used include uranium-aluminum alloys and uranium-zirconium alloys. Suitable cladding materials are aluminum and zirconium alloys, respectively. Extrusion techniques as applied to the prduction of nuclear fuel elements are described in detail in the reference: Kaufmann, A. R., editor, Nuclear Reactor Fuel Elements; Metallurgy and Fabrication, pages 450 et seq., Interscience Publishers, New York (1962).

In nuclear fuel elements, it is generally desirable to minimize temperature gradients throughout the fuel core. Neither hot spots nor cold spots are desirable in the fuel element during irradiation. This uniformity of thermal characteristics makes possible the operation of a nuclear reactor core at maximum power.

Fuel elements, both solid and tubular, having integral fins or ribs are often required in nuclear reactors. A plurality of longitudinal ribs radially spaced on the surface of the fuel element and integral with the cladding material center the fuel element in a fuel cluster of a nuclear reactor and provide additional surface for heat transfer between the fuel core and reactor coolant. Composite fuel elements having integral ribs are generally extruded from cylindrical billets disposed in a cylindrical extrusion container of an extrusion press. The integral ribs are formed during the extrusion by providing rib-forming slits or passages in the extrusion die that correspond to the number of ribs required. Although the physical configuration of the extruded ribs is satisfactory, two undesirable characteristics occur during extrusion: An excessive thickening of the core material and a thinning of the cladding material in the area of the rib roots. This is illustrated, for a solid composite fuel element rod, on p. 252 of Kaufmann, hereinabove cited and, for a composite tube, in FIGS. 1 and 2 of the accompanying drawings, which will be explained in detail hereinafter. The excessive thickness of core fuel material at the rib root creates a hot spot when the fuel element is irradiated in a nuclear reactor. To prevent fuel melt-down, the reactor power must be limited to tolerate these hot spots. Thin cladding at the rib root makes it necessary either to risk fuel element failure or to use cladding that is thicker than necessary over most of the surface of the fuel element. Since, as previously noted, it is desirable to provide a fuel element having uniform thermal characteristics throughout, it will be recognized by those skilled in the art that a slight thickening of the core is desirable in a ribbed fuel element to take advantage of the additional cooling surface provided by the rib. Therefore, while an excessive core thickening that causes hot spots is to be avoided, a slight thickening to provide optimum thermal characteristics is preferred.

SUMMARY OF THE INVENTION

Accordingly, it is an object of the present invention to provide a means to control core upset in the extrusion of ribbed composite members.

It is another object of the present invention to provide a method of controlling circumferential cladding flow during extrusion of ribbed composie members.

It is still another object of this invention to provide a method of extruding ribbed composite nuclear fuel elements having controlled core upset.

These and other objects are accomplished in the present invention by providing a method for extruding ribbed composite members, both solid and tubular, from ribbed composite billets in conjunction with a billet retaining means having rib channels adapted to receive the ribbed billet during extrusion thereof through a member forming means having corresponding rib-forming channels. In accordance with one aspect of this invention, a ribbed composite member is extruded from a ribbed billet, having a composite core and cladding, in an extrusion press that has a suitable container and a member forming means at its discharge end, the member forming means having at least one rib forming channel, and a ram for applying pressure for extrusion of the billet. The composite billet has at least one corresponding longitudinally extending rib that is integral with the billet cladding on a surface of the billet. The billet retaining container is provided with a longitudinal rib channel, corresponding to the billet rib, on its interior surface so that when the billet is placed in the container the billet rib and rib channel are in corresponding mating relationship throughout their longitudinal length. The billet rib and rib channel are of such cross sectional area as to effect controlled reduced circumferential flow of said cladding during extrusion through the member forming means. The billet is then extruded through the member forming means by applying pressure with the extrusion ram to form a ribbed composite member.

For the extrusion of ribbed solid members or rods, a suitable extrusion die is used as the "member forming means"; and for the extrusion of ribbed tubular members, an extrusion die in combination with a suitable tube forming mandrel is used as the "member forming means." A hollow ribbed composite billet is, of course, used if a ribbed tubular member instead of a solid member is to be extruded.

In the extrusion of tubular members, another aspect of this invention is presented, viz., it may be desirable to provide ribs on the interior cladding surface of the tubular member instead of on the exterior cladding surface or on both the interior and exterior cladding surfaces. In this case, the hollow composite billet has at least one longitudinally extending rib that is integral with the cladding on the interior surface of the billet and the mandrel has at least one corresponding longitudinal rib groove in its exterior surface adapted to receive the rib in corresponding mating relationship during extrusion of the ribbed tubular member. In the extrusion of tubular members having interior ribs, the mandrel has a dual function:

(1) The portion of the mandrel coaxially disposed within the extrusion die serves in conjunction with the die as part of the "member forming means"; and (2) The portion of the mandrel longitudinally and coaxially disposed within the billet and extrusion container serves as part of the "billet retaining means."

It has been found that when ribbed composite members are extruded from ribbed composite billets by this method, core upset in the area of the ribs can be substantially prevented or can be successfully controlled to provide a slight core upset by controlling the cross sectional area of the billet rib and container channel to give a desired core upset. Core upset is caused by circumferential flow of the cladding in the area of the rib root. When the ribbed billet is extruded, the circumferential flow of cladding is predetermined and core upset can be controlled by controlling the amount of material in the billet rib area.

Further, the detrimental characteristics, hereinabove noted of ribbed nuclear fuel elements, are practically eliminated by this coextrusion from composite ribbed billets. Because cladding thickness is controlled during extrusion, ribbed fuel elements with thinner nominal cladding can be produced. In addition, ribbed fuel elements can be extruded with greater ratios of rib height to wall thickness.

This invention will be more fully understood by reference to the following description of the problem presented by the prior art and a detailed description of a preferred embodiment of the present invention in conjunction with the appended drawings.

BRIEF DESCRIPTION OF THE DRAWINGS

FIG. 3 is an an isometric view of a preferred embodiment of the present invention showing the extrusion container with an associated extrusion die in cross section and the composite ribbed billet during extrusion of a ribbed tubular member.

DESCRIPTION OF A PREFERRED EMBODIMENT

Figure 2:
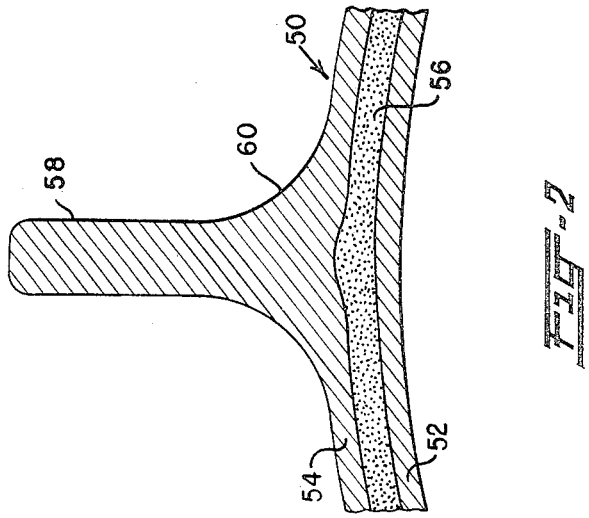
FIG. 2 shows the cross section of the rib of a composite ribbed tubular member that was extruded by the method of the present invention from a ribbed composite billet.
Figure 1:
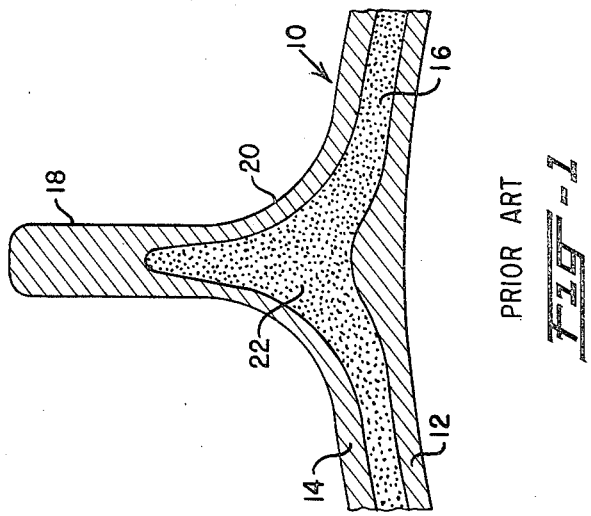
FIG. 1, which illustrates the prior art, shows the cross section of the rib of a composite ribbed tubular member that was extruded from a conventional cylindrical composite billet.

The problem presented by the prior art, in particular, excessive circumferential flow of cladding on the surface of the billet is illustrated in prior art FIG. 1 and in FIG. 2. Referring to prior art FIG. 1, the tubular member 10, extruded from a conventional composite cylindrical billet, comprises an inner cladding 12 and an outer cladding 14 that encases a core material 16 of nuclear reactor fuel. The cross section of integral rib 18, that was formed from the cladding during extrusion, shows extensive core upset 22 in the area of the rib root 20 with the detrimental characteristics of excessive core thickening and cladding thinning.

Referring now to FIG. 2, which shows a tubular member 50 extruded from a ribbed composite billet by the method of the present invention, it will be apparent that circumferential flow of cladding is substantially reduced and only slight core thickening is apparent. Tubular member 50 of FIG. 2 comprises an inner cladding 52 and an outer cladding 54 that encases a core material 56 of nuclear reactor fuel. Integral rib 58 was formed, during extrusion, from the rib of a ribbed billet, rather than by circumferential cladding flow. In the area of the rib root 60 there is only slight thickening of the core material or thinning of the cladding due to circumferential flow.

The present invention will now be described in detail with particular reference to the preferred embodiment illustrated in FIGS. 3 and 4. In FIG. 3, an extrusion container 30, suitable for use in a conventional extrusion press (not shown), is provided with a removable liner 32 and a suitable member forming means. The member forming means comprises a die 70 and a mandrel 48, the die 70 being disposed at the discharge end of the container 30. The die 70 and mandrel 48 are held in place by the extrusion press in a conventional manner. The liner 32 has a billet passage 33 adapted to receive an extrusion billet 38 which is extruded by pressure from an extrusion ram 46. In this embodiment, a tubular member 50 is being formed over the mandrel 48. The billet 38 is a composite billet (see FIG. 4) and is provided with a plurality of longitudinally extending ribs 40, 40' radially spaced about the surface of the billet 38 and integral with the cladding thereof. Liner 32 has substantially the same interior physical configuration as the exterior surface of billet 38, i.e. a plurality of longitudinal grooves defining channels 34 corresponding to the billet ribs 40, 40' are provided in the billet passage 33. A cut-off block 42 and a dummy block 44 are disposed immediately behind the billet 38 in liner passage 33. The cut-off block and dummy block 44 also have longitudinal ribs corresponding to the billet ribs 40, 40'. The die 70 has an opening 71 machined to conform to the desired reduction from billet 38 to member 50 and has a plurality of rib-forming channels 72 corresponding to the longitudinal ribs 40, 40' of billet 38. Since FIG. 3 illustrates the extrusion of a tubular member, the billet 38 is extruded over a mandrel 48 that is axially disposed in the liner 32 and die 70 by a mandrel ram 49 during the extrusion.

The composite tubular member 50 that is extruded from billet 38 has a plurality of longitudinally extending ribs 58, 58' integral with outer surface of tube cladding 54. Between the outer cladding 54 and the inner cladding 52 there is a layer of core material 56.

Although the present embodiment is illustrated using a removable liner 32 so that billets having different physical configurations can be extruded through the same container, it is also possible to use a container, without a liner, having longitudinal channels for extrusion of ribbed billets. Another suitable billet retaining means is to prvoide a hydraulic fluid in lieu of the channeled container liner as in hydrostatic extrusion described by Pugh, H. L. D. and Low, A. H. "The Hydrostatic Extrusion of Difficult Metals," Journal of the Institute of Metals, 93, 7, pp. 201–217 (March 1965).

Solid composite ribbed members can also be extruded from solid composite ribbed billets. In extruding solid billets the mandrel 48 is not used so that the only member forming means is the die 70.

Figure 4:
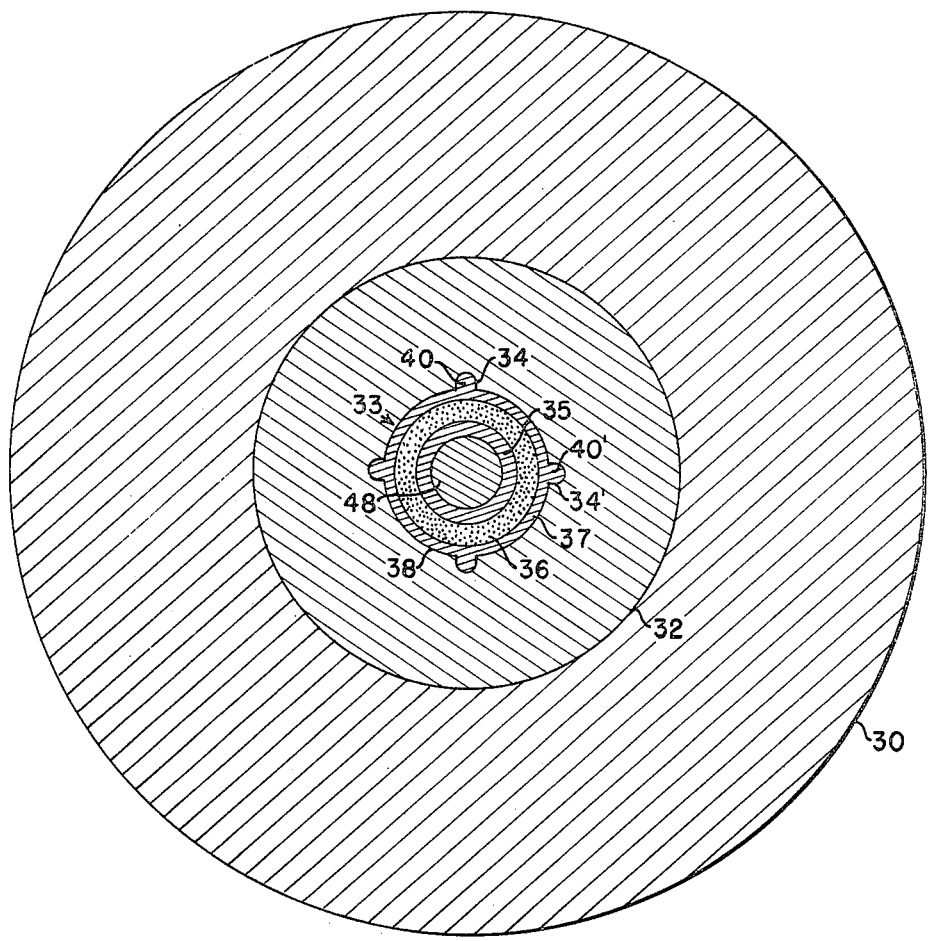
FIG. 4 is a cross sectional view taken along line 4—4 of FIG. 3 showing the container, billet and mandrel of the preferred embodiment.

In FIG. 4, which shows the hollow composite billet 38 and the extrusion container 30 in cross section along 4—4 of FIG. 3, the billet 38 is slidably disposed in removable liner 32 of container 30. The billet 38 has an inner cladding 35 and an outer cladding 37 that encases a core material 36. Integral with the outer cladding 37 is a plurality of longitudinal ribs 40, 40'. The liner 32 of container 30 has a liner passage 33 with a plurality of longitudinal channels 34, 34' adapted to receive in corresponding mating relationship billet ribs 40, 40'. An axially disposed longitudinal mandrel 48 extends through the billet at least as far as the die opening 71 (FIG. 3). The amount of material required in ribs 40, 40' will of course depend on the amount of reduction required and on the desired amount of control of circumferential flow of cladding material during extrusion. However, the billet ribs 40 and channels 34 must be of sufficient cross section to prevent the detrimental circumferential flow of the cladding and excessive core upset hereinabove described. In this preferred embodiment, the billet ribs 40, 40' are fabricated from the same material as the cladding and attached thereto by any suitable means that will provide an integral bond with the cladding. Thus, ribs 40, 40' can be simultaneously formed with the cladding 37 by extrusion fabrication means or they can be attached by a suitable welding method. Also, the ribs 40, 40' can be fabricated from a material, metal or alloy, different from that used in the cladding.

From the foregoing description, the operation of this invention will be apparent to those skilled in the extrusion art. Ribbed composite member 50 is extruded by placing the ribbed composite billet 38 in the billet passage 33 of an extrusion press adapted to receive the extrusion container 30 and liner 32. The billet ribs 40, 40' are in corresponding mating relationship with rib channels 34 of the billet passage 33. If a tubular member is to be extruded from a hollow billet, mandrel 48 is axially positioned in die opening 71 by advancing mandrel ram 49 prior to extrusion. With the cutoff block 42 and the dummy block 44 in position behind the billet 38, pressure is applied by means of extrusion ram 46. Ribbed composite member 50 is then extruded through die 70 that is held in place against the face of container 30 by the extrusion press.

A portion of an extruded tubular member 50 is shown in cross section of the rib in FIG. 2. Tubular member 50, that was extruded from a ribbed billet using the method of the present invention, shows that core upset can be controlled by having a sufficient amount of material in billet ribs and container channels. Tubular member 50 has an inner cladding 52 and an outer cladding 54 which encases a core material 56. As was previously noted, in the vicinity of rib root 60, there is only slight controlled thickening of the core material 56 due to circumferential flow.

In the extrusion of tubular members, ribs can be extruded on the interior cladding surface as well as on the outer cladding surface. In such a case, interior ribs are provided on the inner cladding 35 surface of the billet 38 and the mandrel 48 is provided with rib forming grooves corresponding to the interior ribs in the same manner that rib forming channels 72 are provided in the die 70. Thus, ribbed tubular members can be extruded having ribs on the outer cladding, the inner cladding, or on both cladding surfaces. Circumferential flow and core upset is controlled to prevent excessive core thickening, as hereinabove described for the exterior ribs.

Using the present method, ribbed nuclear fuel elements with controlled core upset can be fabricated by extrusion techniques. It is possible to substantially eliminate core thickening and cladding thinning or to provide a controlled amount of core upset to take advantage of the increased heat dissipating capacity (i.e. cooling capacity) of the ribs and thereby provide optimum thermal characteristics of fuel elements.

Since thinner nominal cladding can be used, the present method will permit manufacture of extremely thin fuel elements that can be used for operation of nuclear reactors at high flux. Thinner cladding provides increased neutron economy during irradiation and decreases the cost of chemical separation and waste storage following irradiation of fuel elements produced in this manner.

What is claimed is:

1. The method of extruding a ribbed composite member from a billet having a composite core and cladding in an extrusion press having billet retaining means, member forming means at its discharge end, and ram means for applying pressure to said billet which comprises:
    (a) providing said billet with at least one longitudinally extending rib that is integral with the cladding of said billet;
    (b) providing at least one corresponding longitudinal rib channel in said billet retaining means, said billet rib and said channel being of such cross sectional area to effect controlled reduced circumferential flow of said cladding during extrusion through said member forming means;
    (c) placing said billet in said extrusion press with said billet rib and said rib channel in corresponding mating relationship; and
    (d) extruding said billet through said member forming means by applying pressure with said ram to form a ribbed composite member with controlled core upset.

2. The method of claim 1 wherein a plurality of said longitudinal ribs are radially spaced about said billet and a plurality of corresponding rib channels are radially spaced in said billet retaining means and in said member forming means.

3. The method of claim 1 wherein said billet retaining means is an extrusion container having said longitudinal rib channel on its interior surface corresponding to said billet rib and said member forming means has at least one corresponding rib forming channel.

4. The method of claim 1 wherein said composite billet is hollow and said billet retaining means includes a mandrel coaxially disposed within said billet.

5. The method of claim 3 wherein said extrusion container is provided with a removably disposed liner having at least one longitudinal rib channel corresponding to said billet rib.

6. The method of claim 4 wherein said hollow billet has at least one longitudinally extending rib on its interior surface and said mandrel has at least one longitudinal rib channel corresponding to said billet rib.

7. The method of claim 1 wherein said ribbed composite member is a nuclear fuel element having a core that includes nuclear fuel material encased in a compatible cladding material.

8. The method of claim 7 wherein said nuclear fuel material is an alloy selected from the group consisting of U–Al and U–Zr and said cladding material is an alloy selected from the group consisting of Al and Zr.

References Cited

UNITED STATES PATENTS

| | | | |
|---|---|---|---|
| 2,890,158 | 6/1959 | Ohlinger et al. | 176—81 |
| 3,205,692 | 9/1965 | Kemprinen et al. | 72—264 |
| 3,331,748 | 7/1967 | Feraday | 176—70 |

VERLIN R. PENDEGRASS, Primary Examiner